United States Patent [19]

Faustini et al.

[11] 3,868,456

[45] Feb. 25, 1975

[54] CERTAIN HYDANTOINS HAVING ANIMAL GROWTH STIMULATING ACTIVITY

[75] Inventors: Remo Faustini; Angelo Tardani; Raffaele Del Monte, all of Milan, Italy

[73] Assignee: Societa' Farmaceutici Italia, Milan, Italy

[22] Filed: May 12, 1972

[21] Appl. No.: 252,852

[30] Foreign Application Priority Data
May 15, 1971 Italy .................................. 24578/71

[52] U.S. Cl. ............................................... 424/273
[51] Int. Cl. ............................................ A61k 27/00
[58] Field of Search ......................... 99/26; 424/273

[56] References Cited
OTHER PUBLICATIONS

Chemical Abstracts, Vol. 72 (1970), p. 66945e

*Primary Examiner*—Vincent D. Turner
*Attorney, Agent, or Firm*—Hubbell, Cohen and Stiefel

[57] ABSTRACT

Compounds which promote the growth of animals and are useful as animal feeds. These compounds have the formula:

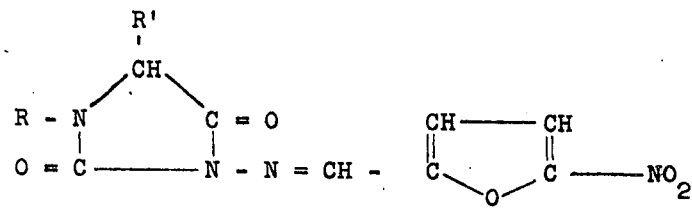

wherein R is hydrogen or lower alkyl; R' is hydrogen; or R and R' may form a cyclic ring of five or six carbon atoms.

2 Claims, No Drawings

CERTAIN HYDANTOINS HAVING ANIMAL GROWTH STIMULATING ACTIVITY

The present invention relates to compounds having animal growth stimulating activity and to animal feeds containing such compounds. More particularly, the invention provides compounds which have the property of promoting the growth of animals and which are useful, therefore, as feed supplements.

It is known that, for breeders, animal feeding is one of the most important problems, particularly from an economic point of view. Consequently, substances capable of stimulating animal growth are of great interest. The choice of substances suitable for this purpose is particularly difficult, as these substances must meet special requirements, and above all, they must be non-toxic, tolerable and appetizing so that they can be easily administered to animals. Some antibiotics are usually employed for this purpose. But these, while promoting animal growth, have certain disadvantages. For example, they may induce a certain adaptation giving rise to bacterial strains resistant to some antibiotics if used in prophylaxis or in the therapy of infectious diseases. A further disadvantage is the necessity to stop the administration of the antibiotic several days before slaughtering in order to avoid the presence of antibiotic residues in the meat, as these are removed slowly.

It has, surprisingly, been found that the compounds of the present invention do not show any of the disadvantages displayed by other substances employed for this purpose. In particular, they are non-toxic; do not include any undesired side effects; are completely removed and, as a result of their high animal growth activity, they are particularly suitable to be used in animal feed.

The compounds of the invention, having the above activity, have the formula:

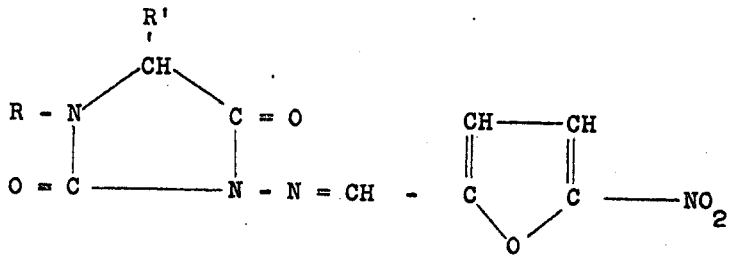

wherein R is selected from the group consisting of hydrogen and lower alkyl; R' is hydrogen or R and R' may form a cyclic ring of five or six carbon atoms.

The above compounds may be prepared according to the following scheme:

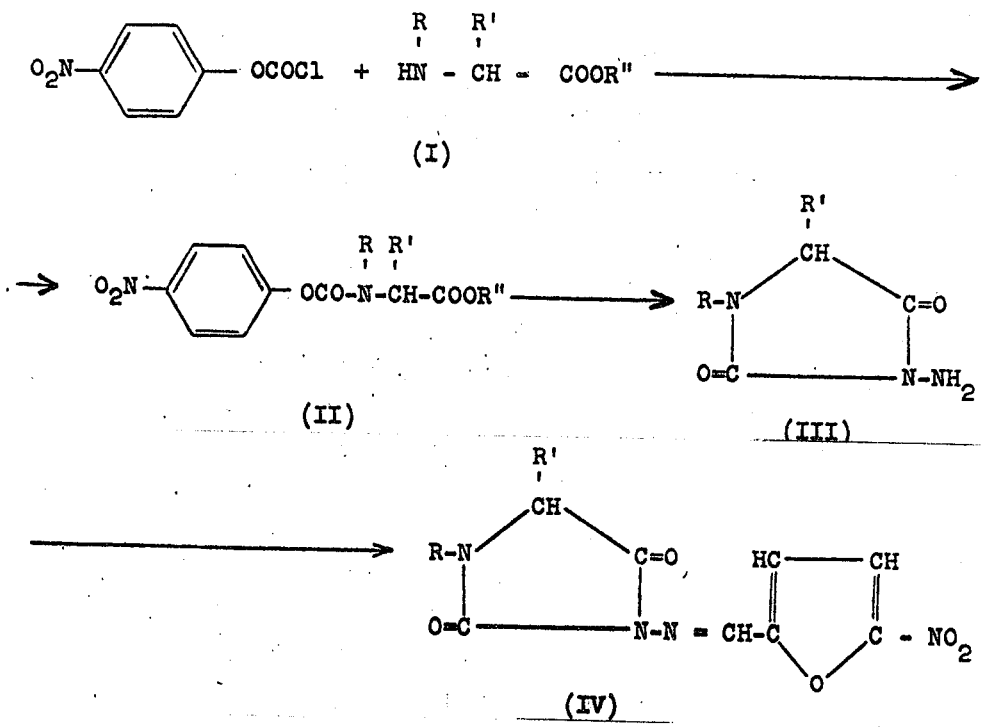

wherein R and R' have the above meaning and R'' is a lower alkyl radical.

More particularly the process comprises reacting the ester of the amino acid having the above formula (I) with p-nitro-phenyl chloroformate, in an inert organic solvent at a temperature between −20° C and +30° C. The product (II), thus obtained, is reacted in the warm with hydrazine hydrate, preferably in an alcohol solution, to obtain the corresponding product (III), which in turn is transformed into the corresponding nitrofurfurylidene derivative (IV), by reaction with 5-nitro-2-furaldehyde, operating preferably in the warm.

The following compounds have proven to be particularly active as growth promoting substances:

1-isopropyl-3-(5'-nitrofurfurylidenamino)-hydantoin,
1-n.propyl-3-(5'-nitrofurfurylidenamino)-hydantoin,
1-sec.butyl-3-(5'-nitrofurfurylidenamino)-hydantoin,
1-isobutyl-3-(5'-nitrofurfurylidenamino)-hydantoin,
1-n.butyl-3-(5'-nitrofurfurylidenamino)-hydantoin,
D,L-2,4-diketo-3-(5'-nitrofurfurylidenamino)-imidazo-(1,5-a) piperidine.

The above compounds are administered to animals preferably by addition to the feed, at the rate of between 1 and 200 g per 100 kilograms. To achieve a complete mixture with the feed, the active compound is blended with one of the ingredients of the diets commonly used in feeding.

The feed containing the products of the invention may be administered to domestic animals in general, for example to birds, broilers or turkeys, to rabbits, hogs, sheep, cattle and horses.

The tolerability of the compounds of the invention was tested in broilers and hogs and evaluated according to the palatability of feed, the growth rate and the food utilization. Such tests have proven that the compounds of the invention are well tolerated even at high doses. It has been also found that the products of the invention tested as growth promoters, have remarkably improved the body weight increase and the feed utilization so as to achieve a conversion index 8 – 9 percent lower than that of the controls. The animal growth stimulating activity of the products of the invention was determined by a test carried out on broilers to which a feed containing 1-n.propyl-3-(5'-nitrofurfurylidenamino)-hydantoin has been administered.

The test was carried out on 360 male chickens, belonging to the stock H 87, 11 days old, grown on bedstead, divided into three groups of 120 subjects each, treated till the 60th day of age according to the following program:

| GROUP | TREATMENT |
| --- | --- |
| C | Basal diet |
| 1 | Basal diet + 0.005% of test compound |
| 2 | Basal diet + 0.010% of test compound |

The basal diet has the following composition:

| | |
| --- | --- |
| Plata maize | 65.20% |
| 44% Soya | 27.20% |
| Dehydrated lucern | 4.00% |
| Dicalcium phosphate | 1.20% |
| Calcium carbonate | 0.90% |
| Sodium chloride | 0.45% |
| Vitaminic-mineral feed supplement without antibiotics | 1.00% |
| dl-methionine | 0.05% |

Feed and drink were available to the animals at will.

The effect of the treatment was evaluated by the body weight increase and the conversion index (ratio between the weight of ingested feed and the body weight increase) and the results obtained and the relative percent differences with respect to the controls (group C) are reported in Table I.

The individual weight of the subjects was taken at the beginning and at the end of the treatment. The data were submitted to the statistical analysis of covariance.

TABLE I

| GROUP | BODY WEIGHT INCREASE | | CONVERSION INDEX | |
| --- | --- | --- | --- | --- |
| | Kg | % Difference | | % difference |
| C | 1.543 | — | 2.93 | — |
| 1 | 1.627 | +5.44 | 2.73 | −6.83 |
| 2 | 1.611 | +4.40 | 2.71 | −7.51 |

From Table I, it is noted that both at the dose of 0.005% and at the dose 0.010%, the test compound (I) has quite improved the utilization of feed with respect to the controls.

In hogs (from 20 kg to about 90 kg of body weight), subjected to rationed feeding, a dose of 5 grams per 100 kg of feed, resulted in a body weight increase of 7% and a conversion index of about 5%. The positive results slightly lessen as soon as the hogs weight reaches 130 kg (+5% for the body weight increase; −3% for the conversion index).

The tests carried out on calves (from 300 to about 450 kg of body weight) have proven the animal growth stimulating efficacy of the test compound also in young cattle fed "ad libitum" both with highly energetic mixture (80 Starch Units per 100 kg) and with reduced energy mixtures (64 Starch Units per 100 kg). The results achieved are given below in Table II:

TABLE II

| GRAMS OF DRUG PER 100 kilos of mixture | ANIMAL SPECIES | BODY INCREASE | CONVERSION INDEX |
| --- | --- | --- | --- |
| 5 g | Broiler | +5% | −6% |
| 5 g | Hogs (body weight below 130 kg) | +7% | −5% |
| | Hogs (body weight above 130 kg) | +5% | −3% |
| 5-10 g | Calves | +4÷8% | −15÷18% |

Analogous results are obtained if, in lieu of the above test compound, the other compounds listed hereinabove are employed.

What is claimed is:

1. A method of promoting the growth of domestic animals comprising feeding to a domestic animal a growth promoting amount of 1-n-propyl-3-(5'-nitrofurfurylidenamino) hydantoin.

2. The method according to claim 1 wherein feeding is effected with an animal feed containing from 1 to 200 grams of 1-n-propyl-3-(5'-nitrofurfurylidenamino)-hydantoin per 100 kilograms of said animal feed.

* * * * *

PO-1050
(5/69)

UNITED STATES PATENT OFFICE
CERTIFICATE OF CORRECTION

Patent No. 3,868,456      Dated February 25, 1975

Inventor(s) Remo FAUSTINI, Angelo TARDANI and Raffaele DELMONTE

It is certified that error appears in the above-identified patent and that said Letters Patent are hereby corrected as shown below:

Title page, left side, under "Foreign Application Priority Data": "24578/71" should read -- 24578 A/71 --.

Column 4, column 3 of Table II, in the heading:

"   BODY   " should read -- BODY WEIGHT INCREASE --.
INCREASE

Signed and Sealed this twenty-ninth Day of July 1975

[SEAL]

Attest:

RUTH C. MASON
Attesting Officer

C. MARSHALL DANN
Commissioner of Patents and Trademarks